United States Patent [19]
Kono et al.

[11] Patent Number: 5,208,524
[45] Date of Patent: May 4, 1993

[54] CURRENT CONTROL APPARATUS FOR PWM CONTROL

[75] Inventors: Shinichi Kono; Hironobu Takahashi, both of Oshino, Japan

[73] Assignee: Fanuc Ltd., Minamitsuru, Japan

[21] Appl. No.: 425,168

[22] PCT Filed: Apr. 21, 1989

[86] PCT No.: PCT/JP89/00428
§ 371 Date: Oct. 2, 1989
§ 102(e) Date: Oct. 2, 1989

[87] PCT Pub. No.: WO89/10655
PCT Pub. Date: Nov. 2, 1989

[51] Int. Cl.⁵ .................................... H02P 7/63
[52] U.S. Cl. ..................... 318/727; 318/723; 318/798
[58] Field of Search .............. 318/599, 800–823, 318/254, 138, 723, 722, 799, 727

[56] References Cited
U.S. PATENT DOCUMENTS

| | | | |
|---|---|---|---|
| 4,611,159 | 9/1986 | Kurakake et al. | 318/803 |
| 4,656,402 | 4/1987 | Nishikawa | 318/341 |
| 4,914,371 | 4/1990 | Shibata et al. | 318/723 |

Primary Examiner—Paul Ip
Attorney, Agent, or Firm—Staas & Halsey

[57] ABSTRACT

A current control apparatus is provided for PWM-control of motor current using a microprocessor. Since motor current enters a control processor as a discrete value, a delay in control always arises. In prior art, it is not possible to accurately predict the actual current value needed for PWM control; as a result, the gain of the current control loop cannot be made large enough. Accordingly, a change pattern of A/D-converted motor current is utilized to estimate what the motor current will be at the present point in time, and current control is carried out based on this motor current. As a result, the delay is made equivalently small and the gain of the current control loop can be freely set, thus improving the response of the current control loop.

10 Claims, 3 Drawing Sheets

CURRENT CONTROL APPARATUS FOR PWM CONTROL

BACKGROUND OF THE INVENTION

1. Technical Field

This invention relates to a current control apparatus for PWM-control of a motor current using a microprocessor.

2. Background Art

In control of a motor, a method of PWM control using velocity information and motor current information is well known. FIG. 4 illustrates an example of a block arrangement of a digital control apparatus for PWM-control of an induction motor.

In FIG. 4, a velocity command signal from a computer enters a velocity controller A. The velocity controller A forms a torque command signal based on an error between the velocity command signal and an actual velocity signal from a velocity detector G connected to an induction motor F, and delivers the torque command signal to a torque controller B. The torque controller B applies a current command signal to a current controller C, where the command signal is compared with actual current obtained by a current detector E. A voltage controller D is driven by the resulting error signal to control the applied voltage of the induction motor F.

When the actual current and the current command signal are compared in the current controller C, current information obtained by AD conversion is already departing from the true value of actual current at the input timing thereof. As a consequence, current overshoot occurs at motor acceleration and current undershoot at motor deceleration. The applicant has already filed a Japanese Patent Application (61-189409) regarding an invention the object of which is to solve the foregoing problem related to control and perform PWM control accurately. The invention disclosed is one in which a PWM command of an inverter which drives an induction motor is outputted by a microprocessor. In this connection, half of a controlled variable (command output) of the preceding cycle is added to a proportion term or proportional integration term for computing the controlled variable of the present cycle in an effort to accurately predict an actually measured value of current required for PWM control of the induction motor. As a result, current overshoot is eliminated and stabilized control can be carried out.

However, with regard to the controlled variable of such a conventional current control loop, an actually measured value of current cannot always be predicted with a method of minimizing error produced by dead time. Consequently, when the gain of the current control loop is made sufficiently high, the amount of the error increases by a wide margin. A problem that results is that the response of the current control loop in PWM control is not sufficiently improved.

SUMMARY OF THE INVENTION

The present invention has been devised to solve the foregoing problems has an object to provide a current control apparatus for PWM control in which a current-change pattern is utilized so that an actual current value in PWM control can be accurately predicted.

In accordance with the present invention, there can be provided a current control apparatus for PWM control in which motor current is subjected to pulse width modulation (PWM) control by a microprocessor, characterized by comprising input means for reading in a motor current value converted into a digital value at a predetermined interval, arithmetic means for predicting an amount of change in the motor current at a present point in time by a current-change pattern decided from motor current information read in previously and a preceding PWM command value, and output means for outputting a PWM command upon correcting the motor current value read in by the amount of change in the motor current, wherein an amount of error caused by a delay in control time required for computing the PWM command is corrected.

Accordingly, the current control apparatus for PWM control according to the invention is such that the amount of change in motor current at the present point in time is predicted based on a current-change pattern stipulated by the commanded voltage value of motor current, with the motor current value read in being corrected.

DESCRIPTION OF THE PREFERRED EMBODIMENT

An embodiment of the present invention will now be described in detail with reference to the drawings.

Figure 1:
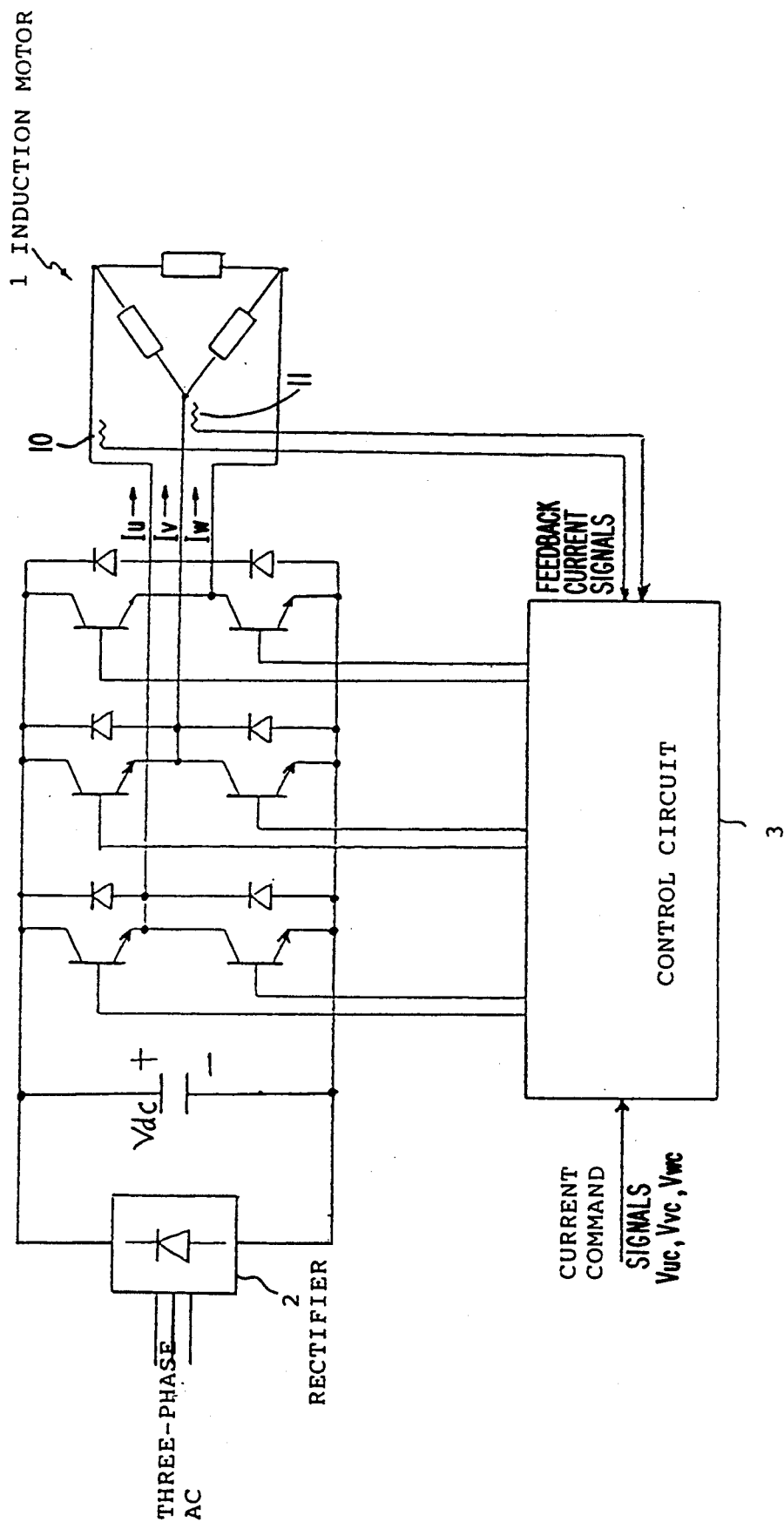
FIG. 1 is a block diagram illustrating an embodiment of the present invention.

FIG. 1 illustrates the simplified construction of a current control apparatus for PWM control in which a three-phase induction motor 1 is subjected to inverter control. A three-phase AC power supply is converted into direct current by a rectifier 2, and the resulting DC voltage Vdc is applied to three pairs of switching transistors. Motor currents Iu, Iv, Iw flow into respective windings of the induction motor 1 in accordance with a PWM command signal outputted by a control circuit 3 constituted by a microprocessor. Among these phases, the U- and V-phase currents Iu, Iv are detected by a current detectors 10 and 11 and are fed back to the control circuit 3 as current feedback signals. The control circuit 3 receives current command voltage signals Vuc, Vvc, Vwc from a velocity computing unit (not shown) as inputs thereto and applies predetermined PWM processing between these signals and the current feedback signals. In the present embodiment, a corrected PWM command signal is formed in accordance with a motor current-change pattern, as set forth below.

Specifically, in a case where the potential of its own phase and the potentials of the other two phases are equal, the motor current does not change. If the potential is the same as that of a first but different from that a second of the other two phases or if the potential is different from those of both of the other two phases, each current value varies as follows:

In the former case, the magnitude $\Delta I$ of the change in current is decided by load impedance and inductance. In other words, since the DC voltage Vdc is expressed by $$Vdc = L(dI/dt)$$

the magnitude $\Delta I$ of the change in current is as follows:

$$\Delta I = (1/L) \times Vdc \times \Delta T$$

In the latter case, the magnitude of the change in current is $2\Delta I$. The reason is that the magnitude of the change in current is proportional to the number of phases having a potential different from its own and to the time. If L, V are assumed to be constant and the substitution $(1/L) \times Vdc = K_1$ is made, then $\Delta T$ can be replaced by differences among the PWM command values Vuc, Vvc, Vwc. Therefore, it is possible to estimate and calculate the magnitude $\Delta I$ of the change in current in each phase as follows:

$$\Delta Iu = K_1(Vuc\text{-}Vvc) + K_1(Vuc\text{-}Vwc)$$

$$\Delta Iv = K_1(Vvc\text{-}Vuc) + K_1(Vvc\text{-}Vwc)$$

$$\Delta Iw = K_1(Vwc\text{-}Vuc) + K_1(Vwc\text{-}Vvc) \quad (1)$$

Figure 2:
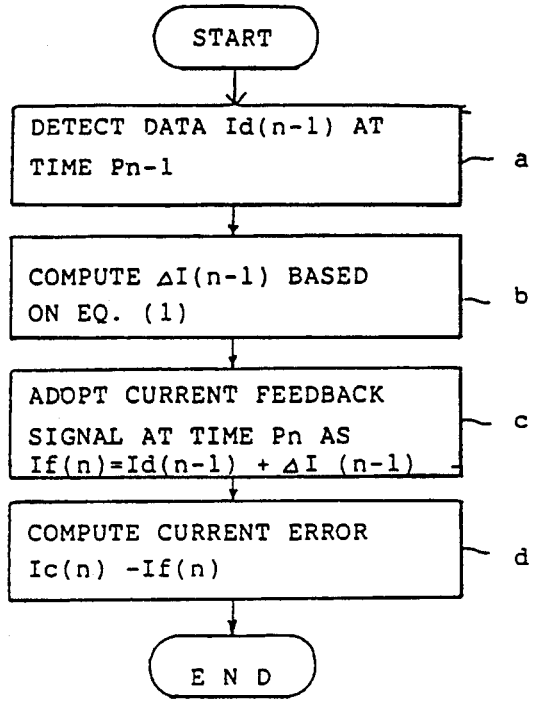
FIG. 2 is a flowchart illustrating a processing procedure for outputting a corrected PWM command.
Figure 4:
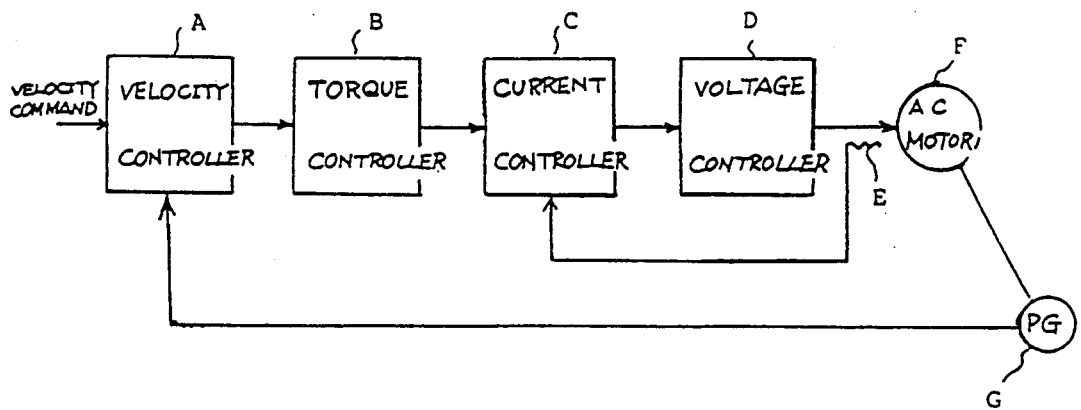
FIG. 4 is a block diagram of a digital control apparatus for PWM-controlling an induction motor.

The processing steps for predicting and computing the amount of change in motor current by the control circuit 3 in order to output the corrected PWM commands will now be described with reference to the flowchart of FIG. 2.

Data at the timing of pulse Pn-1 sampling the feedback current is assumed to be Id(n−1). First, a motor current value Id converted into a digital value is detected (step a), then the amount of change $\Delta I(n-1)$ in motor current based on the Id read in is computed (step b) in accordance with Eq. (1). These items of data Id(n−1) and $\Delta I(n-1)$ are added to arrive at a predicted value of motor current at the present point in time, namely at the next sampling pulse Pn (step c). This is regarded as a feedback current value If(n). If the error between If(n) and a current command Ic(n) inputted to the control circuit is computed at this time (step d), the PWM command signal becomes one in which the delay in control time necessary for this computation is corrected.

Figure 3:
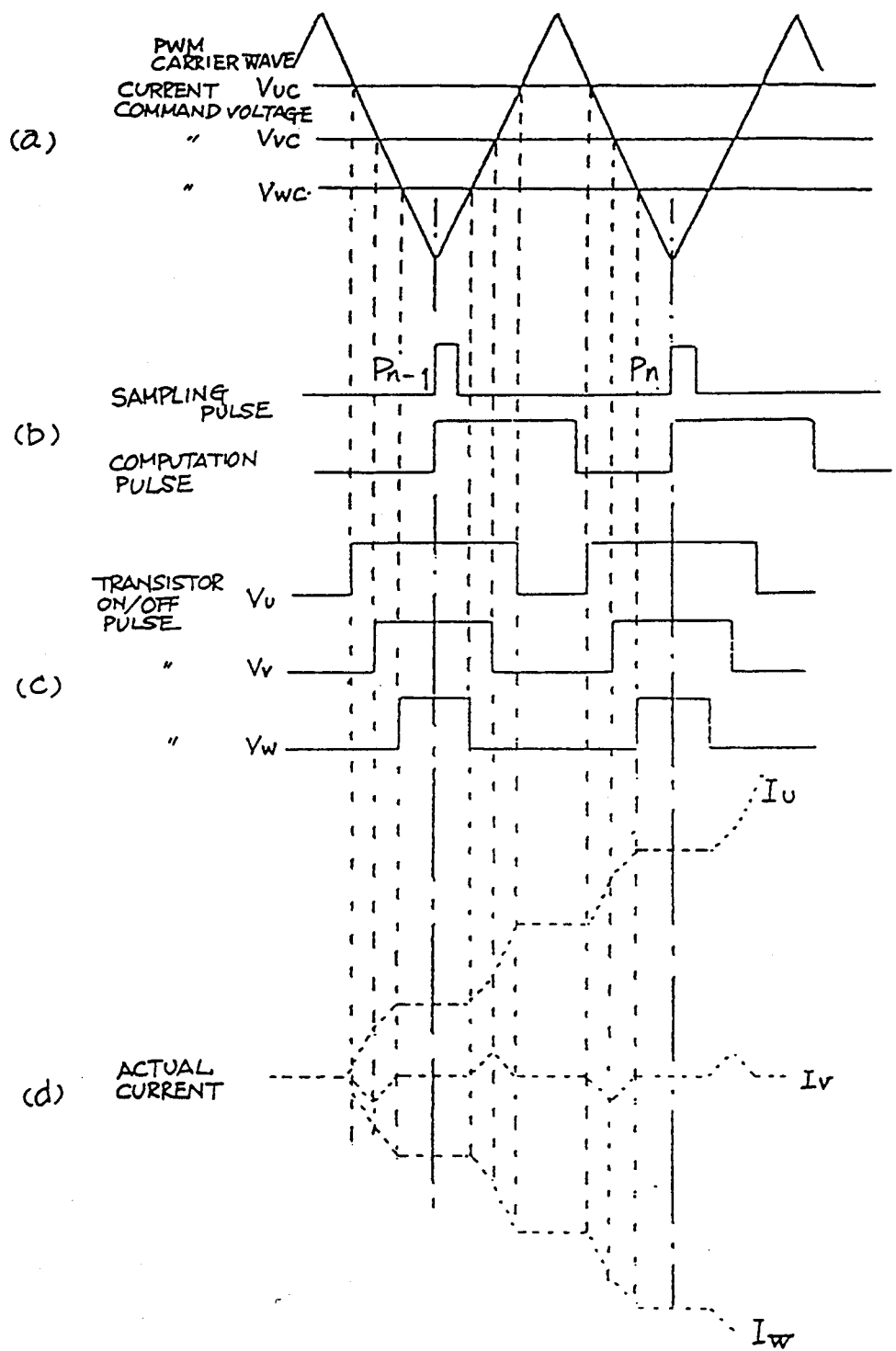
FIG. 3 is an explanatory view illustrating current control timing.

FIG. 3 illustrates the timing waveforms in a case where current control is performed by comparison with current command voltages Vuc, Vvc, Vwc, with the PWM carrier wave being a triangular wave.

When the current command voltages Vuc, Vvc, Vwc enter the control circuit 3, a delay due to processing time occurs in the control circuit 3 with regard to feedback current which enters at the actual current sampling timings n−1, n . . . , as shown in (a) of FIG. 3. However, if a motor current-change pattern is utilized based on a transistor on/off signal shown in (c) of FIG. 3, the actual current shown in (d) of FIG. 3 can be predicted. Accordingly, the current feedback signal approaches the true value and the processing time lag when current control is perforemd becomes equivalently smaller, thus making it possible to freely set the gain of the current control loop.

Though an embodiment of the present invention has been described, the invention it not limited thereto but can be modified in various ways without departing from the scope of the claims.

With the current control apparatus for PWM control according to the present invention, it is possible to neglect the control time delay so that the gain of the current control loop can be freely set, thus improving the response of the current control loop.

We claim:

1. A current control apparatus for pulse width modulation (PWM) control of a motor current through a winding of a motor including first, second and third phases, said apparatus comprising:
    a current detector connected to detect the motor current and output a digital current value at a predetermined interval;
    arithmetic means for receiving first, second and third PWM command signals and for predicting a current change $\Delta I$ at a present point in time by determining the current change $\Delta I$ for at least one of the first, second and third phases of the motor based, respectively, on at least one of $\Delta Iu$, $\Delta Iv$ and $\Delta Iw$ as follows:

$$\Delta Iu = K_1(Vuc\text{-}Vvc) + K_1(Vuc\text{-}Vwc)$$

$$\Delta Iv = K_1(Vvc\text{-}Vuc) + K_1(Vvc\text{-}Vwc)$$

$$\Delta Iw = K_1(Vwc\text{-}Vuc) + K_1(Vwc\text{-}Vvc)$$

wherein
    Vuc is the first PWM command signal,
    Vvc is the second PWM command signal,
    Vwc is the third PWM command signal, and
    $K_1$ is a constant;
    control means for outputting a pulse width modulation control signal based on the digital current value from said current detector and the current change $\Delta I$ from said arithmetic means; and
    a switching circuit operatively connected to said control means and said motor to receive the pulse width modulation control signal and to control the motor in response to the pulse width modulation control signal.

2. A method of pulse width modulation (PWM) control of a motor current through a winding of a motor including first, second and third phases, comprising the steps of:
    (a) sampling the motor current through the winding of the motor;
    (b) receiving first, second and third PWM command signals indicative of a desired current for the first, second and third phases of the motor;
    (c) determining the current change $\Delta I$ for at least one of the first, second and third phases of the motor based, respectively, on at least one of $\Delta Iu$, $\Delta Iv$ and $\Delta Iw$ as follows:

$$\Delta Iu = K_1(Vuc\text{-}Vvc) + K_1(Vuc\text{-}Vwc)$$

$$\Delta Iv = K_1(Vvc\text{-}Vuc) + K_1(Vvc\text{-}Vwc)$$

$$\Delta Iw = K_1(Vwc\text{-}Vuc) + K_1(Vwc\text{-}Vvc)$$

wherein
    Vuc is the first PWM command signal,
    Vvc is the second PWM command signal,
    Vwc is the third PWM command signal, and
    $K_1$ is a constant;
    (d) adding the sampled motor current to the current change $\Delta I$ to obtain a current feedback value; and
    (e) controlling the motor in response to the current feedback value.

3. A method of pulse width modulation (PWM) control of a motor current through a winding of a motor including first, second and third phases, comprising the steps of:

(a) sampling the motor current through the winding of the motor;
(b) receiving first, second and third PWM command signals indicative of a desired current for the first, second and third phases of the motor;
(c) determining a current change based on the first, second and third PWM command signals and determining that no PWM should change occur when the first, second and third current command signals are equal;
(d) adding the sampled motor current to the current change to obtain a current feedback value; and
(e) controlling the motor in response to the current feedback value.

4. A method according to claim 3, wherein said step (c) further includes the substep (c1) determining that the current change should be a particular value $\Delta I$ when two of the first, second and third PWM command signals are equal and that the current change should be two times the particular value $\Delta I$ when none of the first, second and third PWM command signals are equal.

5. A method according to claim 4, wherein said step (c1) includes the substep of
(c1i) determining the particular value $\Delta I$ for at least one of the first, second and third phases of the motor based, respectively on at least one of $\Delta Iu$, $\Delta Iv$ and $\Delta Iw$ as follows:

$$\Delta Iu = K_1(Vuc\text{-}Vvc) + K_1(Vuc\text{-}Vwc)$$

$$\Delta Iv = K_1(Vvc\text{-}Vuc) + K_1(Vvc\text{-}Vwc)$$

$$\Delta Iw = K_1(Vwc\text{-}Vuc) + K_1(Vwc\text{-}Vvc)$$

wherein
Vuc is the first PWM command signal,
Vvc is the second PWM command signal,
Vwc is the third PWM command signal, and
$K_1$ is a constant.

6. A method according to claim 2, wherein the first, second and third PWM command signals in step (c) each comprise a modulated voltage signal to provide a carrier wave for pulse width modulation motor control.

7. An apparatus for controlling a motor connectable to receive a motor current and a PWM command signal, wherein said motor includes first, second and third phases and said PWM command signal comprises first, second and third PWM command signals, said apparatus comprising:
a current detector connected to detect the motor current; and
control means for receiving first, second and third PWM command signals, for determining a current change $\Delta I$, and for outputting a control signal to control the motor based on the current change $\Delta I$ and the motor current, and wherein the current change $\Delta I$ is determined for at least one of the first, second and third phases of the motor based, respectively, on at least one of $\Delta Iu$, $\Delta Iv$ and $\Delta Iw$ as follows:

$$\Delta Iu = K_1(Vuc\text{-}Vvc) + K_1(Vuc\text{-}Vwc)$$

$$\Delta Iv = K_1(Vvc\text{-}Vuc) + K_1(Vvc\text{-}Vwc)$$

$$\Delta Iw = K_1(Vwc\text{-}Vuc) + K_1(Vwc\text{-}Vvc)$$

wherein
Vuc is the first PWM command signal,
Vvc is the second PWM command signal,
Vwc is the third PWM command signal, and
$K_1$ is a constant; and
a switching circuit operatively connected to said control means and said motor to receive the control signal to control said motor in response to the control signal.

8. An apparatus for controlling a motor connectable to receive a motor current and a PWM command signal, wherein said motor includes first, second and third phases and said PWM command signal comprises first, second and third PWM command signals, said apparatus comprising:
a current detector connected to detect the motor current; and
control means for receiving first, second and third PWM command signals, for determining an amount of a current change based on the first, second and third PWM command signals, wherein no current change is determined to occur when the first, second and third PWM command signals are equal, and for providing a control signal to control the motor based on the amount of current change, based on the motor current and based on when a current change is determined to occur; and
a switching circuit operatively connected to said control means and said motor to receive the control signal and to control said motor in response to the control signal.

9. An apparatus according to claim 8, wherein said control means further comprises means for determining that the current change should be a particular value $\Delta I$ when two of the first, second and third PWM command signals are equal and that the current change should be two times the particular value $\Delta I$ when none of the first, second and third PWM command signals are equal.

10. An apparatus according to claim 9, wherein said control means comprises means for determining the particular value $\Delta I$ for at least of the first, second and third phases of the motor based, respectively on at least one of $\Delta Iu$, $\Delta Iv$, 66 Iw as follows:

$$\Delta Iu = K_1(Vuc\text{-}Vvc) + K_1(Vuc\text{-}Vwc)$$

$$\Delta Iv = K_1(Vvc\text{-}Vuc) + K_1(Vvc\text{-}Vwc)$$

$$\Delta Iw = K_1(Vwc\text{-}Vuc) + K_1(Vwc\text{-}Vvc)$$

wherein
Vuc is the first PWM command signal,
Vvc is the second PWM command signal,
Vwc is the third PWM command signal, and
$K_1$ is a constant.

* * * * *